(12) United States Patent
Li et al.

(10) Patent No.: US 8,874,712 B2
(45) Date of Patent: Oct. 28, 2014

(54) SYSTEM AND METHOD FOR DIFFERENTIATED SERVICES IN ADAPTIVE STREAMING

(75) Inventors: Hongbing Li, Belle Mead, NJ (US);
Sanqi Li, Plano, TX (US); Ye-Kui Wang, Bridgewater, NJ (US); Yue Chen, San Jose, CA (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 426 days.

(21) Appl. No.: 13/010,706

(22) Filed: Jan. 20, 2011

(65) Prior Publication Data

US 2011/0179186 A1  Jul. 21, 2011

Related U.S. Application Data

(60) Provisional application No. 61/296,777, filed on Jan. 20, 2010.

(51) Int. Cl.
*G06F 15/16* (2006.01)
*H04L 29/06* (2006.01)

(52) U.S. Cl.
CPC .......... *H04L 65/4084* (2013.01); *H04L 65/80* (2013.01); *H04L 65/602* (2013.01)
USPC ........... 709/223; 709/231; 709/224; 370/235; 370/345; 370/312; 370/349; 370/232; 455/68

(58) Field of Classification Search
CPC ......... H04L 47/10; H04L 47/11; H04L 47/20; H04L 47/2416; H04L 47/2425; H04L 24/2441; H04L 47/2458; H04L 47/24666; H04L 65/80; H04B 17/0042; H04B 7/06; H04W 28/0268; H04W 28/22; H04W 28/27; H04W 88/10; H04W 8/18
USPC .......... 709/233, 231; 370/328, 465, 392, 229, 370/235

See application file for complete search history.

(56) References Cited

U.S. PATENT DOCUMENTS

| | | | | |
|---|---|---|---|---|
| 6,055,571 | A * | 4/2000 | Fulp et al. | 709/224 |
| 6,445,679 | B1 * | 9/2002 | Taniguchi et al. | 370/232 |
| 2002/0072333 | A1 * | 6/2002 | Gnesda et al. | 455/67.1 |
| 2004/0057456 | A1 * | 3/2004 | He et al. | 370/465 |
| 2004/0205768 | A1 * | 10/2004 | Lott | 719/313 |
| 2005/0076136 | A1 * | 4/2005 | Cho et al. | 709/231 |

(Continued)

OTHER PUBLICATIONS

Liu Li-uan, The Research of Quality of Experience Evaluation Method in Pervasive Computing Environment, 2006.*

(Continued)

*Primary Examiner* — Thuong Nguyen
(74) *Attorney, Agent, or Firm* — Slater & Matsil, L.L.P.

(57) ABSTRACT

A system and method for differentiated services in adaptive streaming are provided. A method for server operations includes: determining an optimization of aggregated quality of experience scores for a set of candidate subscribers served by a server; adjusting a service rate of at least one subscriber based on the determined optimization of aggregated quality of experience scores; and streaming information to the at least one subscriber based on the adjusted service rate. The optimization is based on one or more of: a subscriber level for one or more of the plurality of subscribers; a current service rate; and available service rates.

25 Claims, 6 Drawing Sheets

(56) References Cited

U.S. PATENT DOCUMENTS

| | | | |
|---|---|---|---|
| 2006/0095472 A1* | 5/2006 | Krikorian et al. | 707/104.1 |
| 2006/0146703 A1* | 7/2006 | Cha et al. | 370/229 |
| 2006/0215596 A1* | 9/2006 | Krishnaswamy et al. | 370/328 |
| 2007/0276933 A1* | 11/2007 | Lee et al. | 709/223 |
| 2007/0280245 A1* | 12/2007 | Rosberg | 370/392 |
| 2008/0107028 A1* | 5/2008 | Wan | 370/235 |
| 2009/0300632 A1* | 12/2009 | Falcon et al. | 718/103 |
| 2010/0299552 A1* | 11/2010 | Schlack et al. | 714/4 |

OTHER PUBLICATIONS

Yun Shen, QoE-based Evaluation Model on Video Streaming Service Quality, 2012.*

"Diffserv—The Scalable End-to-End Quality of Service Model," Cisco Systems, Aug. 2005, 19 pages.

Blake, S., et al., "An Architecture for Differentiated Services," RFC 2475, Dec. 1998, 21 pages.

Flegkas, P., et al., "A Policy-Based Quality of Service Management System for IP DiffServ Networks," IEEE Network, Mar./Apr. 2002, pp. 50-56.

Mykoniati, E., et al., "Admission Control for Providing QoS in DiffServ IP Networks: The TEQUILA Approach," Advances in QoS, IEEE Communications Magazine, Jan. 2003, pp. 38-44.

Pantos, R., "HTTP Live Streaming," Apple, Inc., Informational Internet Draft, Oct. 5, 2009, 21 pages.

Shin, J., et al., "Adaptive Packet Forwarding for Relative Differentiated Services and Categorized Packet Video," IEEE, 2001, pp. 763-767.

Zambelli, A., "IIS Smooth Streaming Technical Overview," Microsoft Corporation, Mar. 2009, 17 pages.

* cited by examiner

SYSTEM AND METHOD FOR DIFFERENTIATED SERVICES IN ADAPTIVE STREAMING

This application claims the benefit of U.S. Provisional Application No. 61/296,777, filed Jan. 20, 2010, entitled "Fair and Differentiated Services in Adaptive Streaming," which application is hereby incorporated herein by reference.

TECHNICAL FIELD

The present invention relates generally to digital communications, and more particularly to a system and method for differentiated services in adaptive streaming.

BACKGROUND

In general, streaming (or media content streaming) refers to a multimedia service wherein a subscriber (or subscribers) may receive (or simultaneously receive) and playback media content, such as music, images, video, multimedia, and so on. The media content may be sourced by a server to the subscriber(s) over a communications network.

Multiple bit rate based adaptive streaming has been widely adopted in the media content streaming industry today. Existing client-side control or server-side control bit rate adaptation strategies are customer based, e.g., adapting to available communications network bandwidth, computational capability and/or display resolution of a display device of a subscriber, or so on.

When a server's streaming capability bound or limit is reached, a denial of service to some subscribers may occur. A typical technique that may be employed when a server's streaming capability bound is reached is to reduce the quality (e.g., bit rate) of the media content being served to the subscribers without consideration being given to the impact of the bit rate reduction on media quality being served. For example, a subscriber being served media content at a high bit rate may tolerate a bit rate drop of a few hundred kilobits per second without even noticing any drop in quality, while a subscriber being served media content at a low bit rate may not be able to tolerate a bit rate drop of less than a hundred kilobits per second without incurring a significant quality drop.

SUMMARY OF THE INVENTION

These and other problems are generally solved or circumvented, and technical advantages are generally achieved, by example embodiments of the present invention which provide a system and method for differentiated services in adaptive streaming.

In accordance with an example embodiment of the present invention, a method for server operations is provided. The method includes determining an optimization of aggregated quality of experience scores for a set of candidate subscribers served by a server; adjusting a service rate of at least one subscriber based on the determined optimization of aggregated quality of experience scores; and streaming information to the at least one subscriber based on the adjusted service rate. The optimization is based on one or more of a subscriber level for one or more of the plurality of subscribers; a current service rate; and available service rates.

In accordance with another example embodiment of the present invention, a method for server operations is provided. The method includes: determining a server load of a server that is streaming information to a plurality of subscribers; adjusting a content characteristic for at least one subscriber of the plurality of subscribers if the server load meets a threshold, the adjusting based on an optimization of a quality of experience score for each subscriber of the plurality of subscribers; and streaming information to the plurality of subscribers, each subscriber having information streamed at a respective content characteristic. The content characteristic is unchanged if the server load does not meet the threshold.

In accordance with another example embodiment of the present invention, a communications device is provided. The communications device includes a load computing unit; a content characteristic optimizing unit coupled to the load computing unit; a content characteristic adjusting unit coupled to the content characteristic optimize unit; and a transmitter coupled to the content characteristic adjusting unit. The load computing unit computes an aggregate bandwidth utilization of the communications device; the content characteristic optimizing unit optimizes content characteristics of a set of candidate subscribers of the communications device if the aggregate bandwidth utilization meets a threshold, wherein the optimization is based on an optimization of a quality of experience score for each subscriber in the set of candidate subscribers; the content characteristic adjusting unit adjusts a content characteristic of media content being served to at least one subscriber in the set of candidate subscribers based on the optimization; and the transmitter streams information to the at least one subscriber based on the adjusted content characteristic.

One advantage disclosed herein is that a subscriber's priority, class, subscription level, current streaming bit rate, and so forth, may be considered when making adjustments to a media content stream's bit rate, which may negatively impact the subscriber's media experience.

A further advantage of example embodiments is that the impact on a subscriber's media experience may be adjusted based on the subscriber's priority, class, subscription level, and so forth. Therefore, subscribers paying for a premium experience may not be impacted as those who are paying for a lower experience or are not paying at all.

Yet another advantage of example embodiments is that techniques for minimizing bandwidth requirements for streaming media content as well as maximizing available streaming bandwidth are also used to minimize impact on a subscriber's media experience.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

The making and using of the presently example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a communications network serving different subscriber classes. The invention may be applied to other wireline, wireless, and/or a combination thereof, communications networks.

Figure 1:
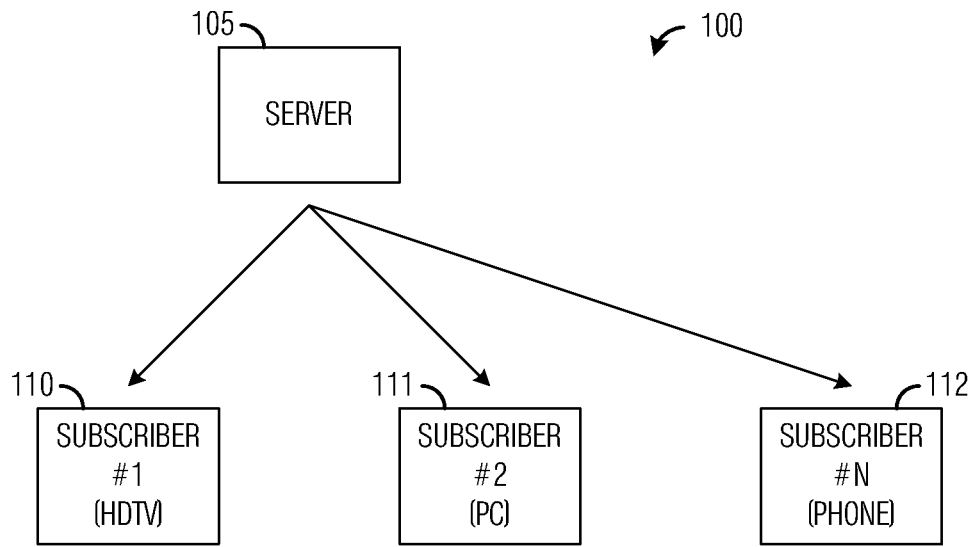
FIG. 1 illustrates an example diagram of a communications system according to example embodiments described herein.

FIG. 1 illustrates a communications system 100. Communications system 100 includes a sever 105 and a number of subscribers, such as subscriber #1 110, subscriber #2 111, and subscriber #N 112. Server 105 may be a media content server capable of streaming media content to its subscribers. As shown in FIG. 1, server 105 is streaming media content to subscriber #1 110, subscriber #2 111, and subscriber #N 112. The media content being streamed to subscriber #1 110, subscriber #2 111, and subscriber #N 112 may be identical or different.

The nature of the media content being streamed to a subscriber may depend on the capability of the subscriber's equipment. For discussion purposes, let server 105 stream identical media content to subscriber #1 110, subscriber #2 111, and subscriber #N 112, but at different bit rates due to the capability of each subscriber's equipment. For example, subscriber #1 110 may be using a High Definition Television (HDTV), subscriber #2 111 may be using a computer (PC), while subscriber #N 112 may be using a smart phone (PHONE) to view the media content being streamed by server 105. Instead of streaming media content at the same bit rate to the subscribers, which would be a waste of network bandwidth or would provide inadequate quality to subscriber #1 110, server 105 may stream the media content at different bit rates to the subscribers.

Although the discussion presented herein focuses on media content at different bit rates, the media content may also be presented at variety of different content characteristics other than bit rate. Examples of different content characteristics for media content may include different bit rates, different frame rates, frame sizes (frame height and/or frame width), spatial resolutions, interlaced, non-interlaced, and so forth. Therefore, the discussion of different bit rates should not be construed as being limiting to either the scope or the spirit of the example embodiments.

Figure 2:
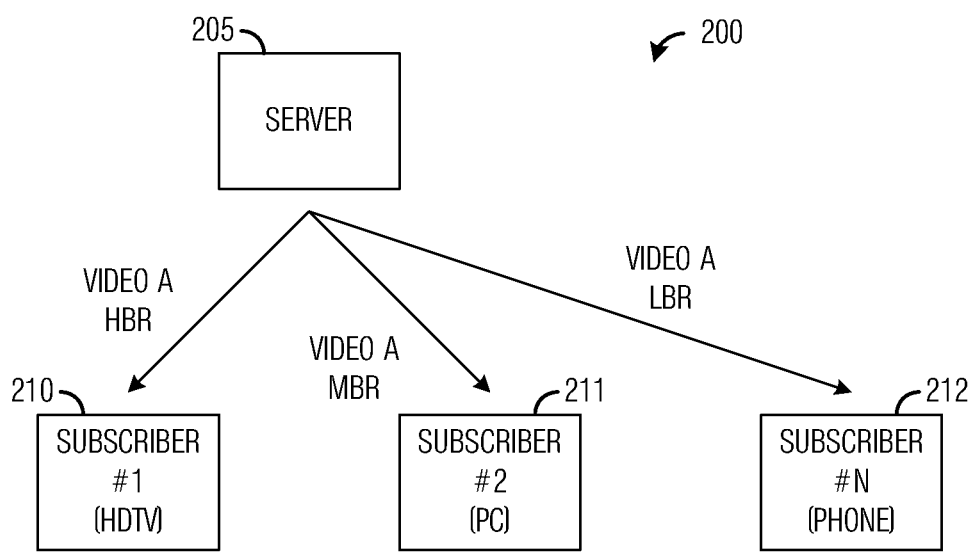
FIG. 2 illustrates an example diagram of a communications system with a server streaming identical media content to different subscribers at different bit rates according to example embodiments described herein.

FIG. 2 illustrates a communications system 200 with a server 205 streaming identical media content to different subscribers at different bit rates. As shown in FIG. 2, sever 205 is streaming Video A at a High Bit Rate (HBR) to subscriber #1 210, Video A at a Medium Bit Rate (VBR) to subscriber #2 211, and Video A at a Low Bit Rate (LBR) to subscriber #3 212, where HBR is greater than MBR and MBR is greater than LBR.

For discussion purposes, media content at different bit rates is considered to be identical if they each originated from the same media content. In order to meet the different bit rate requirements of the subscribers, a server may prepare multiple alternatives for each media content, with each alternative having different media characteristics.

A communications system may have an upper bound on the amount of bandwidth that it can support. Information transmitted when the communications system is operating at or above the upper bound may be prone to collisions and other undesired consequences, which may significantly degrade performance which may include Quality of Service (QoS). As an example, when an aggregated media content streaming bandwidth exceeds the upper bound, the media content being streamed may no longer be ensured of arriving at the subscribers in a timely manner and the media content, when displayed, may be choppy, jumpy, or otherwise exhibit low quality. Therefore, when the communications system is approaching the upper bound, there is a desire to throttle down the bandwidth utilization to ensure that the subscriber experience is not impacted or minimally impacted.

According to an example embodiment, a system and method for offering differentiated service capability with an optimized aggregated Quality of Experience (QoE) for all or a subset of subscribers. According to another example embodiment, a service provider may offer governed streaming bit rate adjustments before the communications system reaches its upper bound, with streaming service capabilities that are differentiated based on subscriber status (such as subscriber type, subscriber priority, subscription level, or so on).

A subscriber's subscription level may be an indication of a service level or quality that the subscriber expects to receive from the service provided. For example, a high level subscription (e.g., a VIP subscription or VIP subscriber) may pay a significant fee to receive the highest possible service level from the service provided with performance guarantees, while a low level subscription (e.g., a free subscription/subscriber or a base subscription/subscriber) may not pay any fees but may not even be guaranteed service and/or may need to watch advertisements before, during, and/or after the media content.

As an example of differentiated service, the service provider may offer guaranteed bit rates (or more generally, content characteristics) for certain (higher) levels of subscribers while for others, bit rates may be degraded as the communications system approaches its upper bandwidth limit. Furthermore, fine grained and/or advanced media adaptation as well as transcoding may be offered for higher levels subscribers. According to another example embodiment, techniques that minimize bandwidth utilization and/or maximize available bandwidth may be employed.

Figure 3:
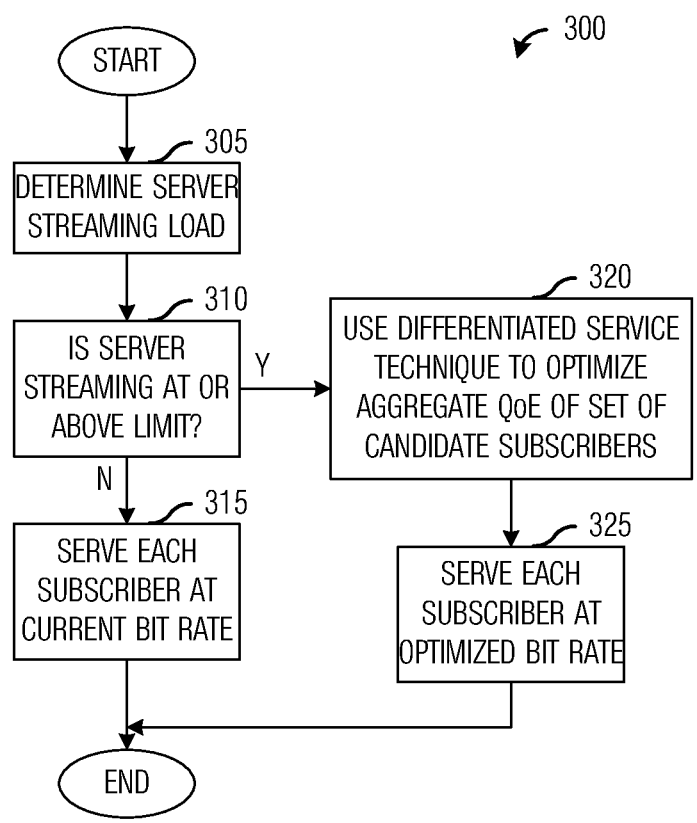
FIG. 3 illustrates an example is a flow diagram of operations occurring in a server for adjusting subscriber bit rates based on communications network conditions according to example embodiments described herein.

FIG. 3 illustrates a flow diagram of operation 300 occurring in a server for adjusting subscriber bit rates based on communications network conditions. Operations 300 may be indicative of operations occurring in a server, such as server 205, as the server adjusts subscriber bit rates (or more generally, content characteristics) based on communications network conditions to help prevent the server from exceeding its upper bandwidth limit. Operations 300 may occur while the server is in a normal operating mode.

Although operation 300 may occur in the server that is actually serving the media content to the subscribers, operation 300 may also occur in a controller, such as a server controller, a centralized controller, a routing control, or so on, that may control a configuration of subscribers being served by a server. Therefore, the discussion of operation 300 occurring in the server should not be construed as being limiting to either the scope or the spirit of the embodiments.

Operations 300 may begin with the server determining its streaming load (block 305). According to an example embodiment, the server may determine its streaming load by adding up the bit rates for all or a subset of the media content that it is currently streaming. Some additional load may be added to compensate for overhead. Alternatively, the overhead may already be built into the upper bandwidth limit. The server may periodically determine its streaming load to help ensure that it is not exceeding its upper bandwidth limit. Alternatively, the server may determine its streaming load whenever a trigger event occurs. As an example, trigger events may include when the server starts a new stream or when an existing stream terminates, i.e., when there is a change in the bandwidth utilization of the server. Further examples of trigger events may include the receipt of an instruction (initiated by a remote entity, operator, subscriber, or so on) to determine its streaming load, measured error rate meeting a threshold, or so forth.

After determining the streaming load, the server may perform a check to determine if it is at or above its upper bandwidth limit (block 310). If the server is not at or above its upper bandwidth limit, then the server may continue to stream media content to its subscribers at the current bit rates (typically, the optimal bit rates) (block 315).

If the server is at or above its upper bandwidth limit, one or more optimal bit rates may not be serviceable. Furthermore, if the server is at or above its upper bandwidth limit, the server may not be able to serve new subscribers, serve additional streams to existing subscribers, serve existing subscribers with media content having different content characteristics, and so on. Then the server may make use of a differentiated service technique to optimize an aggregated QoE for all of its subscribers (block 320). Optimizing the aggregated QoE for all or a subset of the subscribers may have an effect on a bit rate of media content being served (also referred to as a service rate) to the subscribers. As an example, the server may consider each of its subscribers' priority, current bit rate, optimal bit rate, relative bit rate, and so forth in optimizing the aggregated QoE for all or a subset of its subscribers. A detailed discussion of the optimization the aggregated QoE for all or a subset of subscribers is provided below.

According to an example embodiment, the server may optimize the aggregate QoE for all of its subscribers that are candidates for bit rate adjustment. As an example, if every subscriber is a candidate for bit rate adjustment, then the server may optimize the aggregate QoE for all of its subscribers. However, if only non VIP subscribers are candidates for bit rate adjustment, then the server may optimize the aggregate QoE for only non VIP subscribers. The subscribers that are candidates for bit rate adjustment may be referred to as a set of candidate subscribers.

A result from the optimization of the aggregated QoE for the set of candidate subscribers is that one or more of the subscribers may have a reduction in its stream's bit rate (or more generally, content characteristics). It may be possible that a first subscriber's bit rate may decrease while a second subscriber's bit rate may increase. Consider an example, wherein a bit rate for a first subscriber is decreased and a bit rate for a second subscriber is increased with the bit rate increase being smaller than the bit rate decrease. The server may begin to serve its subscribers at the adjusted bit rates (block 325).

Figure 4:
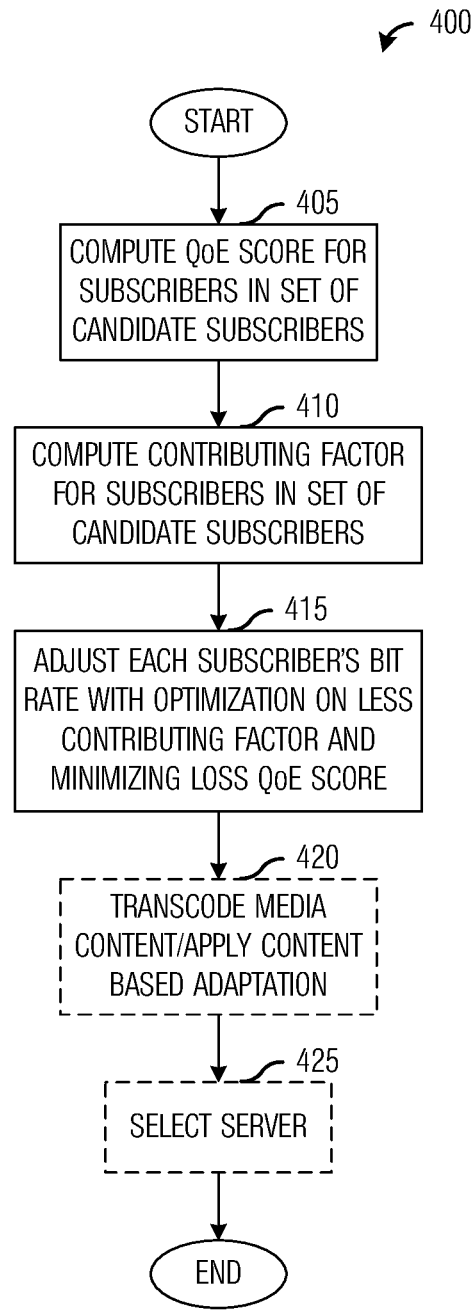
FIG. 4 illustrates an example flow diagram of operations occurring in a server for the optimization of the aggregated QoE for all subscribers according to example embodiments described herein.

FIG. 4 illustrates a flow diagram of operations 400 occurring in a server for the optimization of the aggregated QoE for all subscribers. Operations 400 may be indicative of operations occurring in a server, such as server 205, as the server adjusts the bit rate of at least some of its subscribers to help prevent the server from exceeding its upper bandwidth limit. Operations 400 may be an implementation of block 320 of FIG. 3 "use differentiated service technique to optimize aggregate QoE of all subscribers". Operations 400 may occur while the server is in a normal operating mode.

Although operations 400 may occur in the server that is actually serving the media content to the subscribers, operations 400 may also occur in a controller, such as a server controller, a centralized controller, a routing control, or so on, that may control a configuration of subscribers being served by a server. Therefore, the discussion of operations 400 occurring in the server should not be construed as being limiting to either the scope or the spirit of the embodiments.

Operations 400 may begin with a computation of a QoE score $S_i$ for each subscriber i in a set of candidate subscribers (block 405). According to an example embodiment, the QoE score may be an instantaneous QoE score, meaning that the score is not based on averaged values. The QoE score $S_i$ may be defined from the perspective of server offering, i.e., what bit rate the server is providing at a particular time instance compared to an optimal bit rate. For example, the QoE score $S_i$ may be a value in a range of [0, 1].

For discussion purposes, assume that an optimal bit rate and an actual stream rate for stream S based on a current per-client based adaptation strategy are r and respectively. It may be possible to define $S_i$ as $$S_i = \frac{r'_i}{r_i}.$$

Since the actual stream rate usually does not exceed the optimal bit rate, $S_i$ does not exceed 1. If the server can stream the media content at the optimal bit rate $r_i$ to subscriber i, i.e., $r_i = r'_i$, then $S_i = 1$. However, if the server denies service to subscriber i (i.e., the server elects to not serve the subscriber i), i.e., $r'_i = 0$, then $S_i = 0$. Furthermore, if the server serves subscriber i with a bit rate $r'_i$ where $r'_i < r_i$, then $$S_i = \frac{r'_i}{r_i} \in (0,1).$$

According to an example embodiment, it may be desired to select $r'_i$ such that is equal to a next available bit rate, i.e., a bit rate that has prepared media content that is lower than $r_i$. By selecting an available bit rate, transcoding overhead may be reduced or eliminated. The saved bandwidth $r_i - r'_i$ thus comes with a cost of scarifying instantaneous QoE score of $$LQ_i = 1 - \frac{r'_i}{r_i}$$

for customer i, which is also referred to as a lost QoE score.

Another important factor which impacts the aggregated QoE, besides the instantaneous QoE score, is the rate of bandwidth consumption attributed to QoE score. For example, the same amount of consumed network bandwidth may have different QoE scores for different customers. A contribution factor $E_i$ is defined as $$\frac{1}{r_i}.$$

The server may compute the contribution factor for each subscriber i in the set of candidate subscribers (block 410). The contributing factor for subscriber i may be viewed as the subscriber's impact on overall bandwidth utilization.

As an example, let a first subscriber be a computer based media content subscriber with broadband network access and an instantaneous optimal bit rate of 3.0 Mbps. If the server serves the first subscriber at a bit rate of 2.5 Mbps, the saved bandwidth will be 0.5 Mbps and the lost QoE score is $$1 - \frac{2.5}{3} = 0.1667.$$

The contribution factor is $$E_i = \frac{1}{3} = 0.333,$$

which means 1 Mbps bandwidth only contributes 0.333 to the QoE score for the first subscriber and to the overall total QoE score in the current situation. As another example, if an instantaneous optimal bit rate for a second subscriber with a mobile handset is 0.5 Mbps, if the server serves the subscriber at a bit rate of 0.3 Mbps, the saved bandwidth will be 0.2 Mbps, and the lost QoE score is 0.4 and a contribution factor of 2.0.

The server may then adjust the bit rate of one or more subscribers (block 415). According to an example embodiment, the server may adjust one or more subscriber's bit rates based on an optimization targeted on less contributing factor and minimizing lost QoE score. In order to optimize the aggregated QoE of all subscribers in the set of candidate subscribers, the strategy is downgrading the bit rate of the streaming session with less contribution factor, at the same time, minimizing the QoE score loss. To that end, define a ranking as $$\text{Rank}_i = \frac{S_i}{E_i} = \frac{r'_i}{r_i} \bigg/ \frac{1}{r_i} = r'_i,$$

where $r'_i$ depends on both the multiple bit rate media content offerings and the current optimal bit rate.

According to an example embodiment, rather than adjusting a subscriber's bit rate by an arbitrary amount, the server may chose to adjust the bit rate down (or potentially up) to a bit rate of an already prepared version of the media content being streamed to the subscriber. By adjusting the bit rate to an existing bit rate, the server may save significant overhead by not having to transcode the media content. For some subscribers, such as free or lowest level subscribers, transcoding media content may not be an option since significant overhead is required. However, for VIP or highest level subscribers, transcoding media content may be an option if there is no other way to reduce overall bandwidth utilization with less overhead.

Conceptually, the ranking defined above means that a stream with the highest alternative bit rate, which is below the current optimal bit rate, may be downgraded first. For example, consider a situation with a media content offering at a 3 Mbps highest bit rate, then if 3 Mbps is also the lowest available bit rate, i.e., the next lower alternative bit rate is 0 Mbps, the bit rate is unlikely to be downgraded. However, if the media content offerings come with several lower bit rates, such as 2.5 Mbps, 2 Mbps, 1.5 Mbps, 1.0 Mbps, 0.5 Mbps, and 0.3 Mbps (the alternative bit rates are just for illustration purposes), and the current optimal bit rate is 3 Mbps, then 2.5 Mbps, as the next lower alternative, may likely be picked. However, if the current optimal bit rate is 0.5 Mbps, then the possibility of the next lower alternative bit rate of 0.3 Mbps being picked is low when consideration is given to loss of QoE and contribution factor.

According to an example embodiment, in a situation wherein there are subscribers of different levels or types, then the highest level subscribers (i.e., the VIP subscribers) may be exempted from the ranking order, even if they are part of the set of candidate subscribers.

After adjusting one or more subscriber's bit rate, the server may transcode the media content if media content at the adjusted bit rate does not already exist. Preferably, transcoding is only applied to media content for highest level subscribers since transcoding may consume considerable processing overhead. Also, the server may apply content based adaptation to the media content. Again, content based adaptation may be applied only to media content of highest level subscribers since considerable processing overhead may be required.

Furthermore, a server for a subscriber may be selected so that bandwidth between the server and the subscriber may be maximized. In general, when a server and a subscriber are closely located, then greater bandwidth is available between the two. According to an example embodiment, server selection to maximize bandwidth may be reserved for highest level subscribers, while server selection for load balancing purposes may be applied to lower level subscribers. A detailed discussion of transcoding, content based adaptation, and server selection is provided below.

According to an example embodiment, in a situation wherein there are subscribers of different levels or types, then the highest level subscribers (i.e., the VIP subscribers) may not have their streams' bit rates adjusted. Since the highest level subscribers are paying for a high QoE, lowering their stream's bit rate may negatively impact the high QoE, leading to a low customer satisfaction.

According to an example embodiment, in a situation wherein there are subscribers of different levels or types, then the highest level subscribers (i.e., the VIP subscribers) may have their stream's bit rates adjusted only at a last resort. For example, adjusting the highest level subscriber's bit rates may occur only in a situation wherein if the highest level subscribers' streams' bit rates are not adjusted, the communications network may become unstable. Furthermore, the adjusting of the bit rates may be applied to subscribers on a sliding scale, wherein when a need to adjust bit rates is relatively low, only lower level subscribers may have their bit rates adjusted. Then, as a need to adjust bit rates increase (or when the low level subscribers have already had their bit rates adjusted to a point where they can no longer be adjusted), higher level subscribers may be considered for bit rate adjustment.

Figure 5:
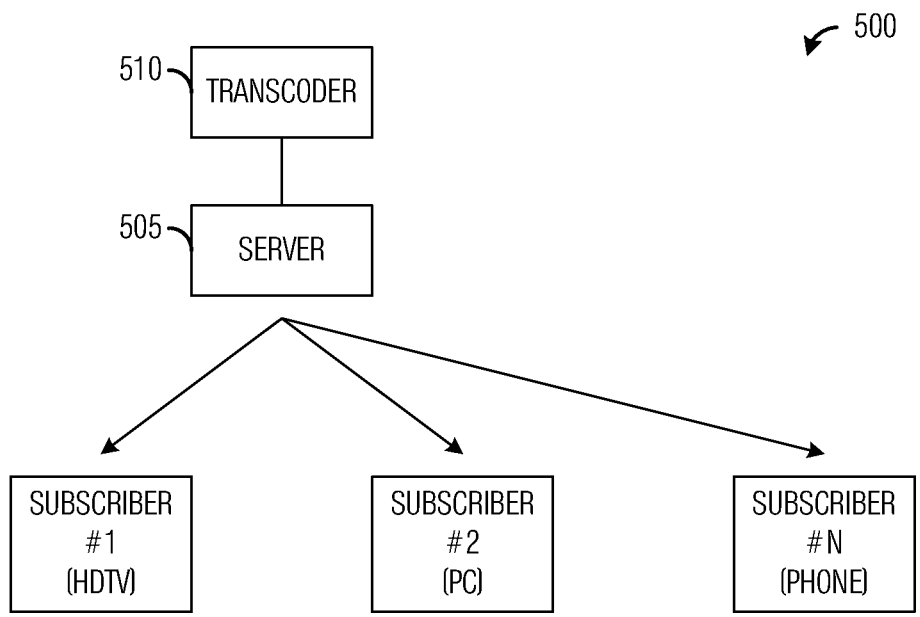
FIG. 5 illustrates an example diagram of a communications system that includes a transcoding enabled or assisted streaming server according to example embodiments described herein.

FIG. 5 illustrates a communications system 500 that includes a transcoding enabled or assisted streaming server 505. As shown in FIG. 5, server 505 may serve a number of subscribers. Communications system 500 may include a transcoder 510 to help server 505 transcode media content dynamically while incurring little additional overhead. Transcoder 510 may provide server 505 with the ability to provide fine grain media content adaptation (bit rate transcoding, for example) without incurring significant processing overhead for itself. The ability to dynamically transcode media content may allow server 505 to adjust the bit rates of media content streams to a larger number of subscribers without significantly sacrificing QoE.

Although shown as a separate entity from server 505, transcoder 510 may be implemented in an integral unit with server 505. For example, transcoder 510 may be in a same box as server 505, transcoder 510 may be located in a same circuit board as server 505, transcoder 505 may be integrated into a same integrated circuit (or field programmable logic array or so on) as server 505, and so forth.

In addition to the network throughput bound of a server, the computation capability is another bound of a server, even if a dedicated transcoder is available. Hence, when a server's computation capability bound reached, dynamic transcoding service may be made available to VIP subscribers (i.e., the highest level subscribers) only, and other subscribers may be serviced with static and prepared media content.

Figure 6:
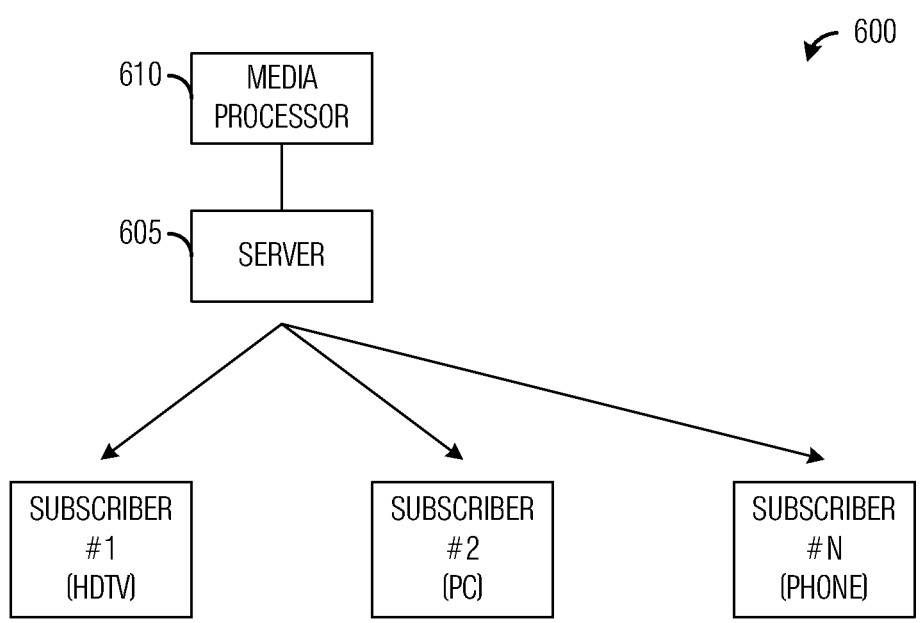
FIG. 6 illustrates an example diagram of a communications system that includes a content-based adaptation enabled or assisted streaming server according to example embodiments described herein.

FIG. 6 illustrates a communications system 600 that includes a content-based adaptation enabled or assisted streaming server 605. As shown in FIG. 6, server 605 may serve a number of subscribers. Communications system 600 may include a media processor 610 to help server 605 to dynamically adapt the media content based on the content of the media content while incurring little additional overhead. Content based adaptation may be used for adaptive zooming, aspect ratio regulation/correction, and so forth.

Media processor 610 may process the media content at the content level. Since content based adaptation may be computationally intensive, a similar differentiated service for different levels of subscribers may be offered. When a computation capability upper bound is reached, content based adaptation may be reserved for only the highest level subscribers (i.e., the VIP subscribers).

Figure 7:
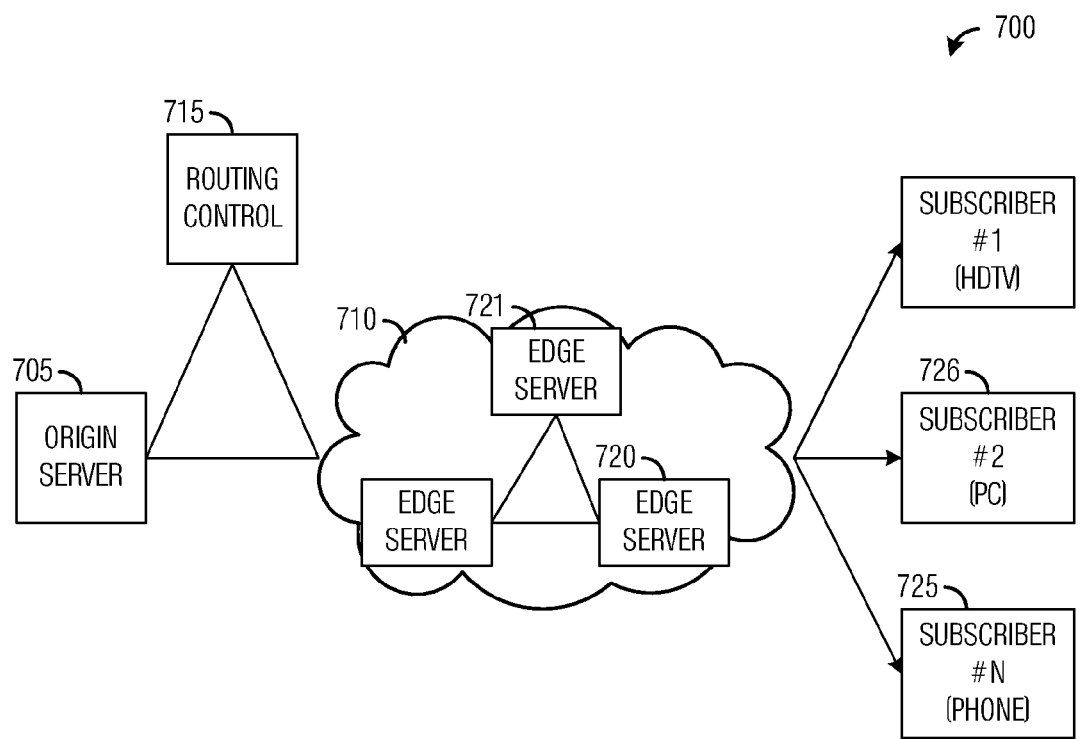
FIG. 7 illustrates an example diagram of a communications system with a plurality of edge servers.

FIG. 7 illustrates a communications system 700 with a plurality of edge servers. In addition to reducing a server's streaming bandwidth utilization to help prevent the server from exceeding its upper bandwidth limit, it may be possible to increase the available bandwidth to help keep the server from ever reaching its upper bandwidth limit. One technique to increase the available bandwidth is to select servers (for example, edge servers) that are closely located to a subscriber. In general, the closer a server is to a subscriber, the greater the bandwidth available between the server and the subscriber. Furthermore, even if the bandwidth availability is not significantly different, latency, reliability, and so forth, may be better.

Communications system 700 includes an origin server 705 that may contain media content at a variety of bit rates, frame rates, resolutions, and other media content parameters. Origin server 705 may be connected to subscribers through a network 710. Network 710 may include a number of edge servers, which may store (or cache) copies of media content for delivery to subscribers. Instead of arbitrarily streaming media content from an edge server to a subscriber, proper selection of an edge server for a subscriber, e.g., selecting based on server bandwidth and/or a distance between an edge server and a subscriber, may provide better QoE. For example, an edge server that is closest to a subscriber may be selected to stream media content to the subscriber.

According to an example embodiment, the selection of servers to maximize available bandwidth may be reserved for highest level subscribers. However, the selection of servers for load balancing purposes may be available to all subscribers.

According to an example embodiment, other server performance criteria may be used in edge server selection. In addition to server bandwidth and server-subscriber distance, server performance criteria may also include edge server load, connection traffic, connection bandwidth, connection latency, connection reliability, subscriber type/priority/level, and so forth, may be used in edge server selection. A routing control unit 715 may be used to select an edge server to serve a subscriber.

According to an example embodiment, in addition to or in lieu of performing edge server selection, routing control unit 715 may perform the operations disclosed in operation 300 (FIG. 3), operations 400 (FIG. 4), or a combination thereof, for adjusting subscriber bit rates. As an example, routing control unit 715 may perform the adjusting of subscriber bit rates for edge servers under is purview, such as edge servers 720 and 721.

As an example, routing control unit 715 may select edge server 720 over edge server 721 to serve subscriber 725. However, edge server 721 may be selected to serve subscriber 726. Furthermore, routing control unit 715 may provide optimal and differentiated service to highest level subscribers by picking edge servers that can provide maximum network throughput to the subscribers without considering load balancing among edge servers.

Although the above discussion focuses on a simple two-level subscriber scheme with VIP subscribers (highest level subscribers) and non-VIP subscribers (lowest level subscribers), the embodiments described herein may be operable with a multi-level subscriber scheme, e.g., a three-level, four-level, five-level, and so on, subscriber scheme. As an example, first class subscribers enjoy services with best QoE, second class subscribers enjoy services with second best QoE, and so forth, to lowest class subscribers enjoy free services but availability and/or QoE are not guaranteed. The first class has the highest priority; the second class has the second highest priority; and so on. The above embodiments can be easily extended to optimize the aggregated QoE of all customers in a fair manner or to provide content-based adaptation.

Figure 8:
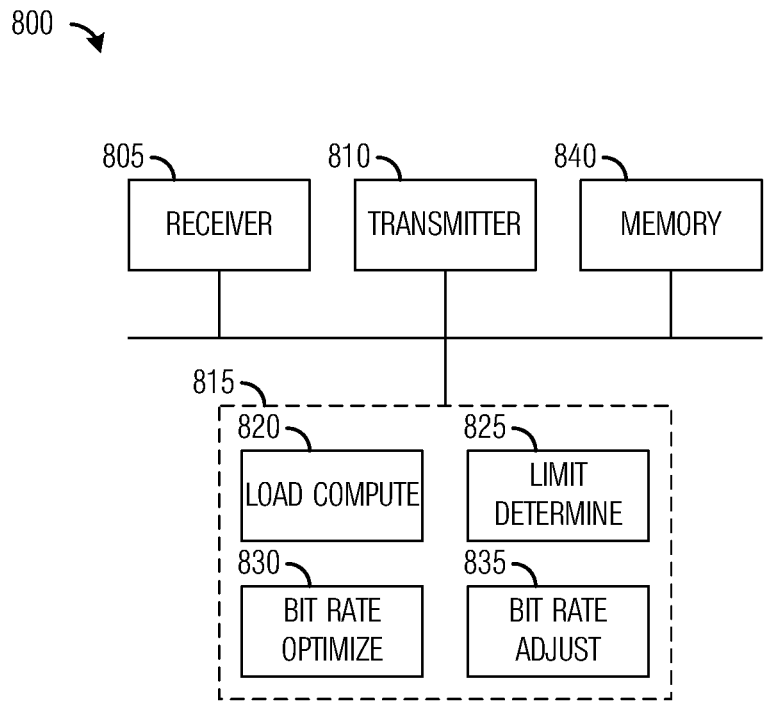
FIG. 8 illustrates an example diagram of a communications device according to example embodiments described herein.

FIG. 8 provides an alternate illustration of a communications device 600. Communications device 800 may be used to implement various ones of the embodiments discussed herein. Communications device 800 may be used as a server.

As shown in FIG. 8, a receiver 805 is configured to receive information and a transmitter 810 is configured to transmit information. A load compute unit 820 is configured to compute an aggregated bandwidth load for subscribers being served. Preferably, the aggregated bandwidth load is an instantaneous value. A limit determine unit 825 is configured to determine if the aggregated bandwidth is at or exceeding an upper bandwidth limit. A content characteristic optimize unit 830 is configured to optimize bandwidth utilization for the subscribers based on QoE scoring, contributing factor, subscriber type, available bit rates, and so on. A detailed discussion of content characteristic optimization unit 830 is provided below.

Content characteristic adjust unit 835 is configured to adjust the content characteristic of the subscribers based on output of content characteristic optimize unit 830. Furthermore, content characteristic adjust unit 835 may apply content based adaptation on the media content. Also, content characteristic adjust unit 835 may transcode the media content to meet the adjusted content characteristic. A memory 840 is configured to store information, such as available bit rates, media content, QoE scoring, contributing factors, and so forth.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 805 and transmitter 810 may be implemented as specific hardware blocks, while load compute unit 820, limit determine unit 825, content characteristic optimize unit 830, and content characteristic adjust unit 835 may be software modules executing in a processor 815 or custom compiled logic arrays of a field programmable logic array.

Figure 9:
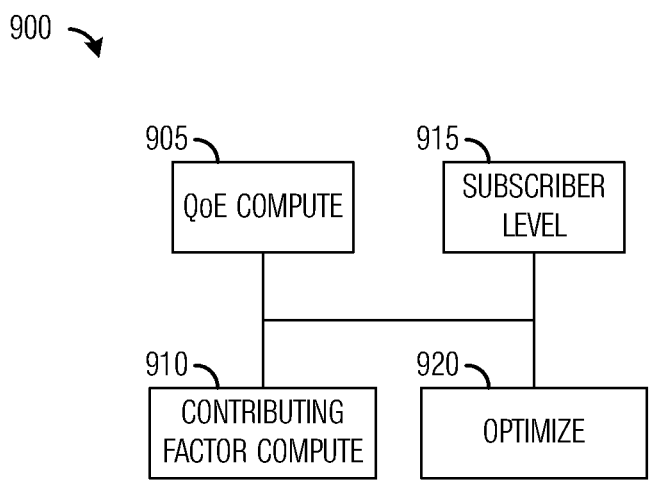
FIG. 9 illustrates an example diagram of a detailed view of a bit rate optimize unit according to example embodiments described herein.

FIG. 9 illustrates a detailed view of a content characteristic optimize unit 900. Content characteristic optimization unit 900 may be an implementation of content characteristic optimize unit 830 of FIG. 8. Content characteristic optimize unit 900 includes a QoE compute unit 905 that computes QoE scores for each subscriber being served, and a contributing factor compute unit 910 that computes a contributing factor for each subscriber being served. A subscriber level unit 915 is configured to make use of subscriber level information in adjusting content characteristics. For example, except for extreme circumstances, content characteristics of highest level subscribers are not adjusted, while special techniques, such as dynamic transcoding and/or content based adaptation are provided for highest level subscribers. An optimize unit 920 is configured to make adjustments to the bit streams of the subscribers based on the QoE, contributing factor, and subscriber level for each subscriber.

Content characteristic optimize unit 900 may be implemented as an integrated circuit, software modules in a processor, or a combination thereof.

The above described embodiments of communications device 800 and content characteristic optimize unit 900 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 3, and 4—is used to indicate the desired specific use (or non-use) of such terms.

Advantageous features of embodiments of the invention may include: A bit rate control policy for fair service of all customers. The existing client-side control or server-side control bit rate adaptation strategies are per session based or per customer based, i.e., adapting to the available bandwidth, computation capability and display resolution of terminal device session by session, customer by customer. When the server streaming capability upper bound is reached, the bit rates of some sessions will be decreased to allow new streaming sessions to be established. It reduces the probability of deny of services while optimizes the aggregated QoE of all the customers.

Advantageous features of embodiments of the invention may include: A scheme that offers differentiated service capability per customer status and supports various VIP service capabilities in adaptive streaming with an optimized aggregated QoE.

Advantageous features of embodiments of the invention may include: A first differentiated service scheme for VIP and/or premium paid customers. The optimal bit rate video/audio streams adapting to the current network bandwidth, terminal device capability of VIP customers will be fulfilled first no matter the capability bound of streaming server reached or not. In the case of server capability bound reached, the bit rates of some other ordinary customers will be sacrificed to some degrees.

Advantageous features of embodiments of the invention may include: A second differentiated service scheme where fine grained media adaptation request fulfilled first for VIP customers in the case of on-line transcoding assisted streaming server. Fine grained media adaptation capability can be offered by on-line transcoding with the cost of extensive computation. When server computation capability bound reached, the on-line transcoding service will only be opened to VIP customers, and other ordinary customers will be serviced with static and prepared contents.

Advantageous features of embodiments of the invention may include: A third differentiated service scheme where advanced adaptation is guaranteed for VIP customers first. In this case, content based adaptation and other advanced adaptation services are offered to different customers per their customer status.

Advantageous features of embodiments of the invention may include: A forth differentiated services scheme with streaming throughput maximization policy for VIP customers in the case of CDN cache server selection. For ordinary customers, both the streaming throughput and load balancing among all cache servers will be considered for re-directing to the right cache server at the right time.

Advantageous features of embodiments of the invention may include: A low cost optimization algorithm for aggregated QoE based bit rate adjustment and service differentiation.

Advantageous features of embodiments of the invention may include: New QoE metric, instantaneous QoE score $S_i$ and lost QoE score $$LQ_i = 1 - \frac{r'_i}{r_i}$$

for differentiated adaptive streaming services.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for server operations, the method comprising:
   streaming media to multiple subscribers being served by a server;
   computing an individual quality of experience (QoE) score for each of the multiple subscribers;
   computing a contributing factor for each of the multiple subscribers;
   computing an aggregated QoE score for the multiple subscribers in accordance with the individual QoE scores and the contributing factors for the multiple subscribers;
   determining that a streaming load of the server exceeds a threshold;
   adjusting, by a server configured on a network device, service rates for the multiple subscribers in accordance with the aggregated QoE score to reduce the streaming load of the server below the threshold, wherein adjusting service rates for the multiple subscribers comprises selecting a new service rate for at least one subscriber, and wherein the new service rate is excluded from a list of available bit rate (ABR) service rates; and
   streaming media to the multiple subscribers at the adjusted service rates, wherein streaming media to the multiple subscribers comprises transcoding media to obtain transcoded media having the new service rate, and streaming the transcoded media to the at least one subscriber.

2. The method of claim 1, wherein the contributing factor for a given subscriber corresponds to an impact of the given subscriber's service rate on overall bandwidth utilization.

3. The method of claim 2, wherein computing an individual QoE score for each of the multiple subscribers comprises computing an individual QoE score for a given subscriber (i) in accordance with the following formula:

$$S_i = \frac{r'_i}{r_i},$$

where $r_j$ is a highest service rate for subscriber i, $r'_i$ is a current service rate for subscriber i, and i is an integer value.

4. The method of claim 2, wherein computing a contributing factor for each of the multiple subscribers comprises computing a contributing factor for a given subscriber (i) in accordance with the following formula:

$$E_i = \frac{1}{r_i},$$

where $r_i$ is a highest service rate for subscriber i, and i is an integer value.

5. The method of claim 2, wherein adjusting service rates for the multiple subscribers comprises applying content based adaptation.

6. The method of claim 1, wherein an individual QoE score for a given subscriber comprises a ratio between a highest service rate for the given subscriber and an actual service rate for the given subscriber.

7. The method of claim 1, wherein an individual QoE score for a given subscriber comprises a ratio between a highest service rate for the given subscriber and an adjusted service rate for the given subscriber.

8. The method of claim 1, wherein adjusting service rates for the multiple subscribers to reduce the streaming load of the server below the threshold comprises:
   selecting a sub-set of subscribers in the multiple subscribers; and
   adjusting service rates for the sub-set of subscribers without adjusting service rates for other subscribers in the multiple subscribers.

9. The method of claim 1, wherein selecting a sub-set of subscribers in the multiple subscribers comprises:
   identifying candidate subscribers in the multiple subscribers having subscription levels that permit their service rates to be adjusted; and
   selecting the sub-set of subscribers exclusively from the candidate subscribers.

10. The method of claim 1, wherein adjusting service rates of the multiple subscribers in accordance with the aggregated QoE score comprises:
    identifying candidate subscribers having subscription levels that permit their service rates to be adjusted; and
    selecting subscribers from the candidate subscribers and adjusted service rates for the selected subscribers in a manner that reduces the streaming load of the server below the threshold while minimizing the aggregated QoE score.

11. The method of claim 1, wherein adjusting service rates of the multiple subscribers in accordance with the aggregated QoE score comprises:
    reducing a bit-rate at which data is streamed to at least one subscriber.

12. The method of claim 1, wherein the service rates specify bit-rates in which data is streamed to the multiple subscribers.

13. An apparatus comprising:
    a processor; and
    a computer readable storage medium storing programming for execution by the processor, the programming including instructions to:
    stream media to multiple subscribers being served by a server;

compute an individual quality of experience (QoE) score for each of the multiple subscribers;
compute a contributing factor for each of the multiple subscribers;
compute an aggregated QoE score for the multiple subscribers in accordance with the individual QoE scores and the contributing factors for the multiple subscribers;
determine that a streaming load of the server exceeds a threshold;
adjust service rates for the multiple subscribers in accordance with the aggregated QoE score to reduce the streaming load of the server below the threshold, wherein the instructions to adjust service rates for the multiple subscribers include instructions to select a new service rate for at least one subscriber, and wherein the new service rate is excluded from a list of available bit rate (ABR) service rates; and
stream media to the one or more subscribers at the adjusted service rates, wherein the instructions to stream media to the multiple subscribers includes instructions to transcode media to obtain transcoded media having the new service rate, and to stream the transcoded media to the at least one subscriber.

14. The apparatus of claim 13, wherein an individual QoE score for a given subscriber comprises a ratio between a highest service rate for the given subscriber and an actual service rate for the given subscriber.

15. The apparatus of claim 13, wherein an individual QoE score for a given subscriber comprises a ratio between a highest service rate for the given subscriber and an adjusted service rate for the given subscriber.

16. The apparatus of claim 13, wherein a contributing factor for a given subscriber corresponds to an impact of the given subscriber's service rate on overall bandwidth utilization.

17. The apparatus of claim 16, wherein the instructions to compute an individual QoE score for each of the multiple subscribers includes instructions to compute an individual QoE component score for a given subscriber (i) in accordance with the following formula:

$$S_i = \frac{r'_i}{r_i},$$

where $r_i$ is a highest service rate for subscriber i, $r'_i$ is a current service rate for subscriber i, and i is an integer value.

18. The apparatus of claim 16, wherein the instructions to compute a contributing factor for each of the multiple subscribers includes instructions to compute a contributing factor for a given subscriber (i) in accordance with the following formula:

$$E_i = \frac{1}{r_i},$$

where $r_i$ is a highest service rate for subscriber i, and i is an integer value.

19. The apparatus of claim 16, wherein the instructions to adjust service rates of the multiple subscribers includes instructions to apply content based adaptation.

20. The apparatus of claim 13, wherein the instructions to adjust service rates of the multiple subscribers in accordance with the aggregated QoE score include instructions to:
select a sub-set of subscribers in the multiple subscribers; and
adjust service rates for the sub-set of subscribers without adjusting service rates for other subscribers in the multiple subscribers.

21. The apparatus of claim 20, wherein the instructions to select a sub-set of subscribers in the multiple subscribers includes instructions to:
identify candidate subscribers in the multiple subscribers having subscription levels that permit their service rates to be adjusted; and
select the sub-set of subscribers exclusively from the candidate subscribers.

22. The apparatus of claim 13, wherein the instructions to adjust service rates of the multiple subscribers in accordance with the aggregated QoE score include instructions to:
identify candidate subscribers having subscription levels that permit their service rates to be adjusted; and
select subscribers from the candidate subscribers as well as adjusted service rates for the selected subscribers in a manner that reduces the streaming load of the server below the threshold while minimizing a reduction in the aggregated QoE score.

23. The apparatus of claim 13, wherein the instructions to adjust service rates of the multiple subscribers in accordance with the aggregated QoE score include instructions to:
reduce a bit-rate at which data is streamed to at least one subscriber.

24. The apparatus of claim 13, wherein the service rates specify bit-rates in which data is streamed to the multiple subscribers.

25. A computer program product comprising a non-transitory computer readable storage medium storing programming, the programming including instructions to:
stream media to multiple subscribers being served by a server;
compute an individual quality of experience (QoE) score for each of the multiple subscribers;
compute a contributing factor for each of the multiple subscribers;
compute an aggregated QoE score for the multiple subscribers in accordance with the individual QoE scores and the contributing factors for the multiple subscribers;
determine that a streaming load of the server exceeds a threshold;
adjust service rates for the multiple subscribers in accordance with the aggregated QoE score to reduce the streaming load of the server below the threshold, wherein the instructions to adjust service rates for the multiple subscribers include instructions to select a new service rate for at least one subscriber, and wherein the new service rate is excluded from a list of available bit rate (ABR) service rates; and
stream media to the one or more subscribers at the adjusted service rates, wherein the instructions to stream media to the multiple subscribers includes instructions to transcode media to obtain transcoded media having the new service rate, and to stream the transcoded media to the at least one subscriber.

* * * * *